May 3, 1938.  J. G. JACKSON  2,116,489
BAKING PAN SET
Original Filed Jan. 13, 1937
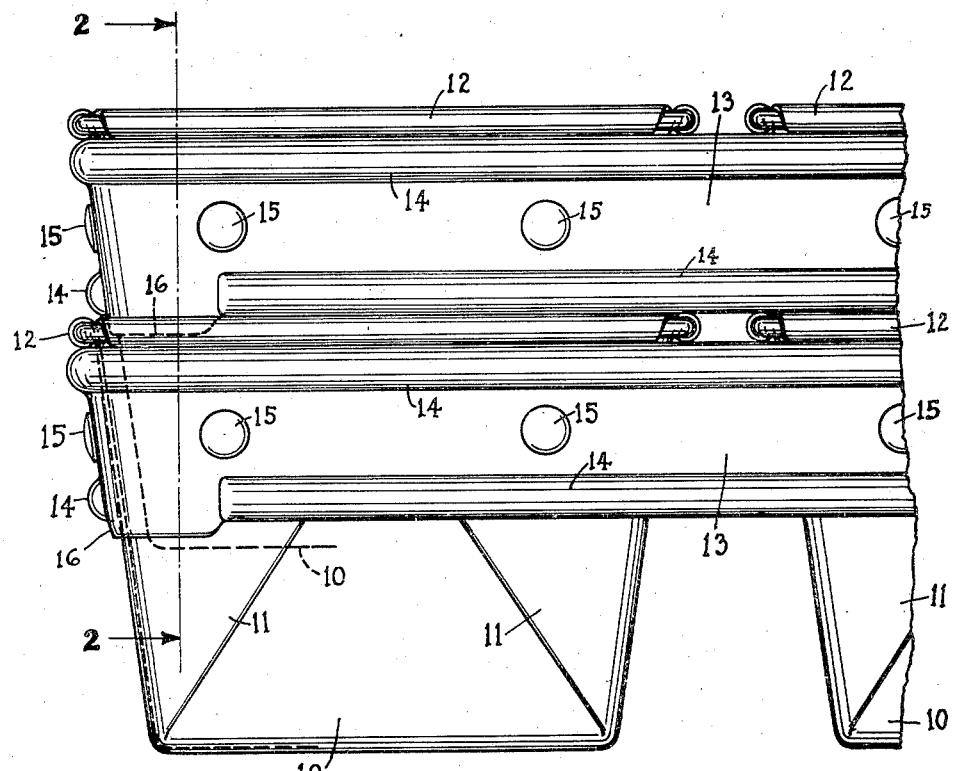
Fig. 1.
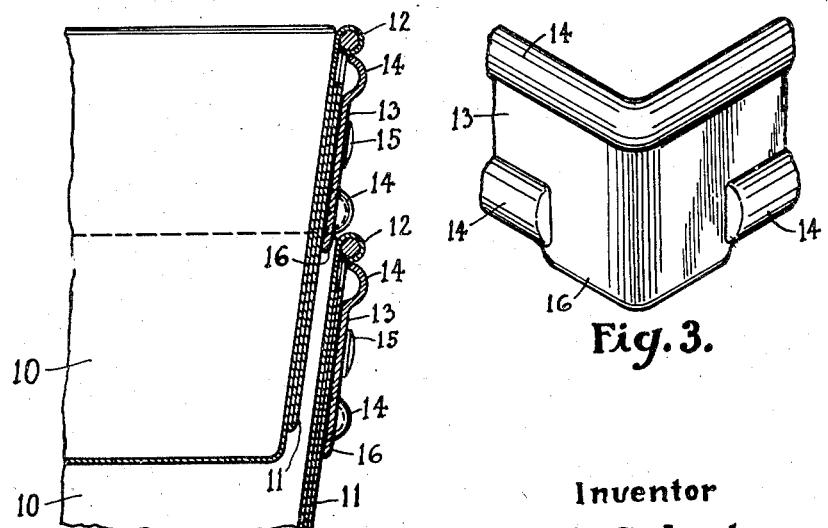
Fig. 2.
Fig. 3.
Inventor
Joseph G. Jackson
By Stanley Hoods
Attorney Patented May 3, 1938

2,116,489

UNITED STATES PATENT OFFICE 2,116,489

BAKING PAN SET

Joseph G. Jackson, Oak Park, Ill., assignor to The Edward Katzinger Company, Chicago, Ill., a corporation of Illinois Application January 13, 1937, Serial No. 120,399
Renewed March 3, 1938

6 Claims. (Cl. 53—6)

This invention relates to baking pan sets each consisting of a plurality of baking pans held in spaced, parallel relation and has for its object to provide nesting means positioned at the corners of the set and operative within the corners of a subjacent pan set when two or more pan sets are nested to create a stack, thereby maintaining the walls of the pans of the set spaced one from the other and preventing longitudinal and transverse relative movement between the nested sets of the stack.

With the above and other objects in view, as will be apparent, this invention consists in the construction, combination and arrangement of parts, all as hereinafter more fully described, claimed and illustrated in the accompanying drawing, wherein:

Fig. 1 is a fragmentary side elevation of two pan sets constructed in accordance with the present invention, nested one within the other to form a stack:

Fig. 2 is a vertical section taken along line 2—2 of Fig. 1; and

Fig. 3 is an elevation of one corner of a pan set illustrating the nesting or centering element extending completely about the outer corner of the end pan of a set.

Baking pan sets, each consisting of a plurality of individual baking pans secured together in spaced parallel relation, when not in use, are nested one within the other to form perpendicular stacks. As it is desirable to have air circulation between the walls of the nested pans of the sets, the sets are so constructed that the walls of the individual pans thereof are spaced from the walls of the pans of a subjacent set by preventing a complete nesting or insertion of the pans of the upper set into the pans of the lower set. By this arrangement there is a certain play or movement possible between the several sets of the stack, both transversely and longitudinally of the sets, which frequently causes the stack to tilt out of the perpendicular and the walls of one pan to rub against the walls of another pan into which it is nested sometimes causing a discoloration on the inner surfaces of the pan walls which not infrequently is transferred to the loaves baked within the pans of the set.

The present invention contemplates the provision of means at the four corners of the set which will be received in the outer-most corners of the end pans of a subjacent set and will limit the movement of the sets relative to each other both longitudinally and transversely of the set thereby maintaining the pan walls spaced and the stack perpendicular.

Reference being had more particularly to the drawing, 19 designates a baking pan, a series of which are placed in spaced, parallel relation, and there held to constitute a multiple unit baking pan set. The type of pan illustrated in the drawing is a folded pan, having corner laps or folds 11 resting flush against the end walls of the pan, but it is to be understood that any type of baking pan may be employed in the present invention. At the upper edges of its walls each pan 10 is provided with the usual outstanding beads 12 formed by bending flanges at the edges of the walls about a rectangular wire frame positioned adjacent the edges of said walls.

In order to combine the pans into a pan set, a strap or straps 13 encircle the pans and rests flush against the exposed walls thereof, i. e., flush against the end walls of the pans on the longitudinal sides of the frame and flush against the exposed side walls of the end pans 10 of the set.

Along each of its longitudinal edges the strap or straps 13 are provided with outstanding beads 14, semi-circular in cross-section, and in that form of pan construction herein shown the straps 13 are secured to the pan by the rivets 15 passing though the longitudinal center of the straps and the corner laps or folds 11 of the pans. It is to be understood however, that any suitable and practical means may be employed to secure the strap 13 to the pans 10.

When two or more pan sets, constructed as above described, are nested one within the other to create a stack, the lower bead 14 of the upper pan set rests upon the outstanding beads 12 of the pans of the subjacent pan set, and prevent the pans 10 of the upper pan set from completely entering and nesting in the pans 10 of the subjacent pan set. This spaces the walls of the pans of the upper pan set from the walls of the pans of the subjacent pan set, and will permit the pan sets of a stack to move relatively to each other both longitudinally and transversely of the sets unless means is provided for preventing such movement.

At each of the four corners of the pan set, i. e. the outer-most corners of the end pans 10 of the set, the strap or straps 13 are bent to pass around the outermost corners of the endmost pans 10 of the set and the lower bead 14 of the strap 13 is flattened to be coplanar with the body of the strap so that a lug or ear 16 is drawn down flush against the side and end walls of the endmost pan 10 and extends below the lower longitudinal edge of the bead 14 of the strap. Thus, at each corner of the pan set is an ear or lug 16 resting flush against the corner of the end pan of the set and extending completely around such corner. This lug or ear 16 as illustrated in Figs. 1 and 2, has a slight bevel and is received in the outermost corners of the endmost pans of a subjacent set when one pan set is nested into another. Thus, each lug or ear 16 completely fills a corner of the end pan of a subjacent pan set, and prevents any possibility of movement of the upper pan set with reference to the lower pan set, both longtiudinally and transversely of the pan sets.

When the lower longitudinal beads 14 of the straps 13 of an upper pan set rest upon the beads 12 of the pans of a subjacent pan set, the lugs or ears 16 at the four corners of the upper pan set enter the outer corners of the end pans of the subjacent pan set and are there seated in approximate horizontal alignment with the beads 12 of the end pans. If there is a tendency of the sets so nested to move relatively longitudinally of the sets those portions of the ears or lugs 16 bearing over the exterior of the outer side walls of the end pans 10 will contact with the inner surfaces of the corresponding walls of the end pans of the subjacent set and prevent such movement and if the tendency is to move relatively transversely of the set, those portions of the ears or lugs 16 bearing over the end walls of the end pans 10 of the set will contact with the inner faces of the corresponding walls of the end pans of the subjacent set and will prevent such movement.

The lugs or ears 16 project only a relatively short distance below the lower edges of the straps 13 and only enter the outer corners of the end pans 10 of a subjacent set sufficiently to prevent relative movement between the nested sets. Hence, these ears or lugs 16 do not ordinarily contact with portions of the inner surfaces of the walls of the pans 10 of a subjacent set that will contact the loaf or other product baked in the pans.

What is claimed is:

1. The combination with a pan set consisting of a plurality of individual baking pans and a rectangular frame surrounding and secured to said pans, of ears formed at the corners of said frame, extending over and bearing flush against portions of the exposed walls of the end pans of the set adjoining the corners of said frame.

2. The combination with a pan set consisting of a plurality of individual baking pans and a rectangular frame surrounding and secured to said pans, of ears formed at the corners of said frame, extending over and bearing flush against portions of the exposed walls of the end pans of the set adjoining the corners of said frame, and projecting downwardly below the lower edge of the frame.

3. The combination with a pan set consisting of a plurality of baking pans and a rectangular frame formed of relatively wide strapping surrounding and secured to said pans, of ears formed at the corners of said frame and extending around the outer corners of the end pans of the set and resting flush against those portions of the exposed walls of the end pans of the set adjoining the outermost corners of said end pans.

4. The combination with a pan set consisting of a plurality of baking pans and a rectangular frame formed of relatively wide strapping surrounding and secured to said pans, of ears formed at the corners of said frame and extending around the outer corners of the end pans of the set and resting flush against those portions of the exposed walls of the end pans of the set adjoining the outermost corners of said end pans, said ears being approximately coplanar with the strap of the frame and having their outer faces slightly beveled.

5. The combination with a pan set consisting of a plurality of baking pans and a rectangular frame formed of relatively wide strapping surrounding and secured to said pans, of ears projecting downwardly coplanar with the strap forming the frame and at the corners thereof, said ears extending around the outer corners of the end pans of the set and resting flush against those portions of the exposed walls of the end pans of the set adjoining the outermost corners of said end pans.

6. The combination with a pan set consisting of a plurality of baking pans and a rectangular frame formed of relatively wide strapping surrounding and secured to said pans, said frame having an outstanding bead along its lower edge terminating adjacent the corners of the frame, of ears at the corners of the frame projecting downwardly in the plane of the frame and resting flush against the portions of the exposed walls of the end pans of the set adjoining the outermost corners of said end pans.

JOSEPH G. JACKSON.